Patented Feb. 26, 1929.

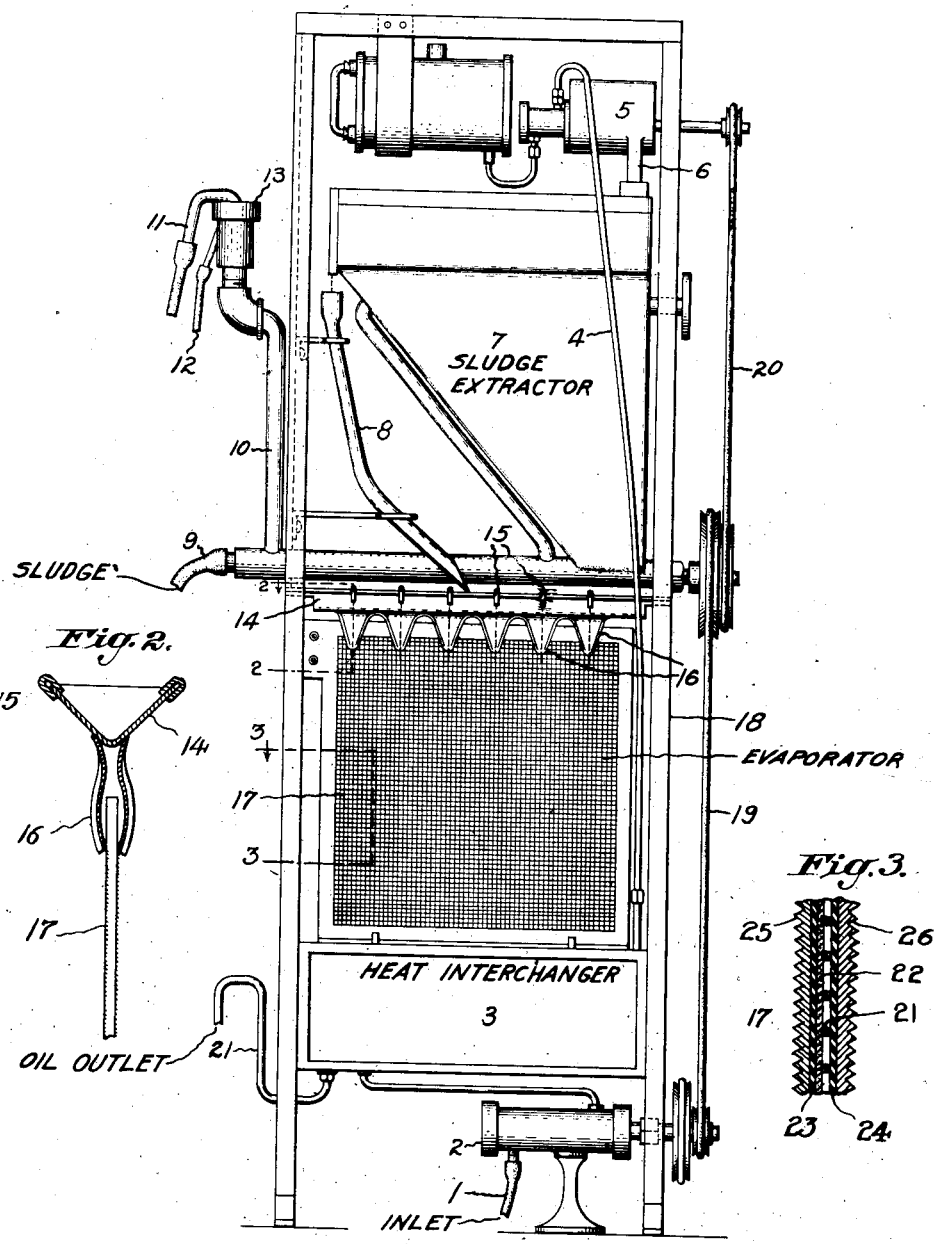

1,703,643

UNITED STATES PATENT OFFICE.

CHARLES VAN BRUNT, OF SCHENECTADY, NEW YORK, ASSIGNOR TO GENERAL ELECTRIC COMPANY, A CORPORATION OF NEW YORK.

HEATING DEVICE.

Application filed March 10, 1925. Serial No. 14,544.

The present invention relates to devices whereby liquids may be heated in thin layers and, if desired, subjected to the action of a current of air or other gas.

In a prior application, Ser. No. 572,601, filed on July 3, 1922, by Van Brunt and Miller is described and claimed an apparatus whereby the diluents from used lubricating oil may be removed. This apparatus contains an evaporator having an exposed heated surface on which is fastened a layer of wire gauze so as to provide numerous capillary spaces through which the oil passes uniformly as a stirring or turbulent film-like layer, thus being advantageously exposed to the air currents which sweep over the evaporator.

Some difficulty is experienced in attaching the wire gauze to the surface of the evaporator. Brazing or soldering is apt to fill up the meshes of the gauze with brass or solder and, if the attachment of the wire gauze is not entirely uniform, the gauze may budge away from the surface of the evaporator and so be ineffective.

In accordance with my present invention I have provided an improved heater or evaporator construction whereby the desired capillary spaces on the evaporator are provided by grooves formed in the surface of a metal plate, these grooves preferably having sides meeting at an acute angle.

The accompanying drawing illustrates in Fig. 1 in side elevation a unit of an oil recovery apparatus which embodies my present invention. Figs. 2 and 3 are sectional detail views taken on lines 2—2 and 3—3 respectively.

In this oil recovery apparatus the evaporator whereby the diluents are removed from lubricating oil is mounted on a common support with various devices whereby suspended solid matter is removed from the oil. Although my present invention is not concerned with these clarifying devices, they have been shown in the drawing in order to illustrate a complete apparatus and will be briefly described in their relation to the evaporator. The material to be purified, which in the case of the present apparatus consists of used crank case oil which is both dirty and diluted with low boiling point hydrocarbons similar to gasoline, is drawn from a storage tank (not shown) through a pipe 1 by a pump 2 and fed first to a clarifying device. The oil is circulated through a heat interchanger 3, through which also passes in supply ducts not shown, the warmed purified oil received from the evaporator. From the heat interchanger the oil passes by a conduit 4 to a mixing device 5, where water glass from a storage tank is mixed with the oil. From this mixing device the oil is delivered by a conduit 6 to an extraction tank 7 where it flows over a body of water and is delivered to a conduit 8. In its passage in contact with water the solid matter in the oil which has become agglomerated with water glass settles out into the water and is discharged as a sludge through the outlet 9. A constant level of water is maintained in the extraction tank 7 by a standpipe 10 in which water is maintained with a constant head by an inflow through a pipe 11 which exceeds the outflow. The standpipe 10 is surrounded by a casing 13 by which the excess supply of water is collected and drained through the pipe 12.

The oil from which solid matter and water glass have been substantially entirely removed is delivered by the tube 8 to a trough 14 (see Fig. 2) and flows over the sides of the trough upon the surface of the evaporator. A uniform distribution of the oil upon the evaporator is secured by a number of metal guides 15, which are held loosely in contact with the sides of the trough and extend from the oil within the trough to the upper surface of the evaporator as indicated. The oil seeps through the capillary spaces between these guides and the trough and drips from the pointed distributors 16 upon the outer surface of the evaporator 17. The described apparatus is held within a vertical frame 18 with various moving parts being suitably driven through belting 19—20, or in any other suitable manner. The purified oil flows through ducts in the heat interchanger 3 and is discharged through an outlet pipe 21.

As best shown in Fig. 3 the evaporator or rectifier is provided with an electric heater 21 mounted on a suitable support 22, upon opposite sides of which are mounted plates 23, 24 of insulating material, upon which in turn the metal plates 25, 26 are fastened. The outside surface of these plates are provided with a criss cross of angular grooves as indicated in the drawing.

Although the construction or form of the heater forms no part of the present invention, I prefer to construct the heater to cause the temperature of the evaporator to vary from 100° C. at the top to about 150° C. at the bottom.

Plates 25, 26 which conveniently consist of brass, and may be about ⅛" thick, are provided as indicated with a system of intersecting grooves which are about 1/16" apart, both vertically and horizontally. The sides of the grooves are inclined about 60° with respect to each other so as to provide minute troughs of capillary dimensions through which the oil will spread and will move in such a way as to renew the surface which is in contact with air currents passing over the heated surface and carrying away gasoline and other vapors which are evaporated from the oil. The grooves in a given direction may be produced simultaneously by means of a gang cutter but any convenient mechanism means may be used for cutting them.

What I claim as new and desire to secure by Letters Patent of the United States, is:—

1. An evaporator constructed and arranged to receive a surface layer of a liquid, the surface of said evaporator being engraved with intersecting grooves of capillary dimensions whereby said liquid will be spread into a thin film.

2. In a fractional evaporation apparatus, an evaporator for liquids having a surface provided with intersecting capillary grooves having sides which meet at an acute angle, and heating means contained within said evaporator.

3. In a fractional evaporation apparatus, an evaporator provided with intersecting grooves the sides of which meet at an angle of about 60°, and which are spaced apart about 1/16 inch.

4. An evaporating device comprising a plate provided with a criss cross of grooves the sides of which meet at sharp angles affording spaces of capillary dimensions, means for supporting said plate in an upright position, internal means for heating said plate, means for feeding a liquid at distributed points along the upper edge of said plate, and means for collecting the liquid after having passed over said plate.

5. An apparatus of the class described comprising a liquid supply means, a metal plate having a substantially flat surface on which are engraved intersecting grooves of capillary dimensions, means for supporting said plate in a substantially vertical position, means for heating said plate, distributing means affording a plurality of capillary ducts leading from said supply means to the upper part of said plate and liquid collecting means at the lower part of said plate.

In witness whereof, I have hereunto set my hand this 9th day of March, 1925.

CHARLES VAN BRUNT.